(Model.)

P. W. McGUIRE.
FELLY PLATE.

No. 285,290. Patented Sept. 18, 1883.

H. B. Biddle
Chas. H. Truschll
Witnesses:

Patrick W. McGuire
Inventor.
by
Higgins & Chaney
his attorneys

UNITED STATES PATENT OFFICE.

PATRICK W. McGUIRE, OF SOUTH BEND, INDIANA.

FELLY-PLATE.

SPECIFICATION forming part of Letters Patent No. 285,290, dated September 18, 1883.

Application filed March 19, 1883. (Model.)

*To all whom it may concern:*

Be it known that I, PATRICK W. McGUIRE, of the city of South Bend, St. Joseph county, and State of Indiana, have invented a new and useful Improvement in Felly-Fastenings, of which the following is a specification.

My invention relates to the fastening of the felly-joints in the rim of wheels used on wagons, buggies, and other vehicles.

Heretofore the joints of fellies have been fastened by means of a "dowel-pin" extendending about an equal distance into the end of each felly on each side of the joint, and by bolts extending through the tire and the felly on each side of the joint, and by the felly-plate on the under or inside of the felly, and held secure by nuts screwed on the ends of the tire-bolts above the felly-plates. This method of fastening is objectionable for several reasons: first, because boring or drilling two holes through the tire at each joint weakens the tire; second, because when the tire becomes loose it racks and often splits the rim or felly and breaks the joint; third, because the nuts on the inside of the rim or felly make a rough protuberance, which gathers grass and rubbish, and does not make a neat finish.

The object of my invention is to avoid these objections and to provide a fastening for felly-joints that shall be entirely independent of and disconnected from the tire, dispensing with the dowels and separate nuts, and make a smooth nice finish on the inner edge of the felly, giving superior strength and durability at the same time.

Figure 1:
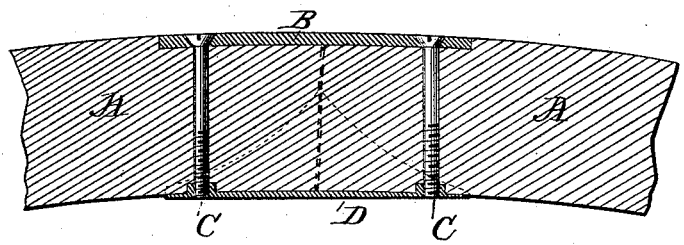

My invention consists in fastening the felly-joints in the rim of wheels by means of a strip of iron or "iron plate" of sufficient length and width for strength, according to the use to which the wheel is intended, to be let into the top or outside of the rim or felly level with the surface of the wood, and extending an equal distance on each side of the joint with square ends, which fit tightly and snugly against the wood, and thus form a close joint and a brace to the convex surface of the wheel, and strengthen the rim of the wheel, as is shown in Fig. 1 of the drawings, hereto attached. This plate of iron is held in place by means of two bolts or screws, the heads of which are countersunk into and level with the plate, one passing through each end of the plate, through the felly, and into the felly-plate, as shown in Fig. 1. From this construction and arrangement it will be seen that this plate not only forms a brace, as before described, but, in addition, when the screws are passed through it, serves as a coupling for preventing the fellies from moving away from each other, the felly-plate on the inside of the fellies serving by its countersunk nuts to hold the felly at such inside point in a similar manner, thus securing great rigidity in the felly-joint entirely independent of the tire. The felly-plate is made of iron, to fit the rounded part or the inside of the felly, and extends an equal distance on each side of the joint. On the concave or inside of this felly-plate, and exactly the same distance apart as the countersunk holes through the outer plate, is a nut or lug, through which is a hole with a thread cut therein to receive the screw ends of the bolts passing through the outer iron plate, and the felly, and tightly screwed into this nut or lug, as above described and shown. The same result may be reached and my invention covers the reversing of the bolts or screws, countersinking the heads of the screws into the felly-plate, and cutting the thread in the outer plate.

Figure 2:
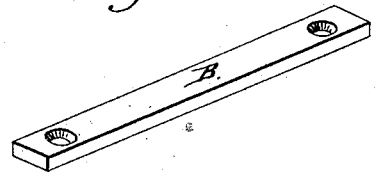
Figure 3:
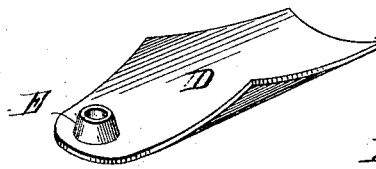
Figure 4:
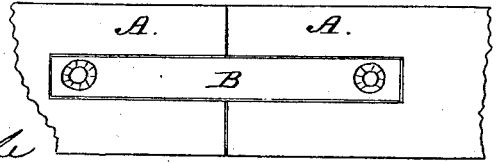

In the accompanying drawings, Figure 1 represents in section two fellies joined according to my invention. Fig. 2 is a perspective view of the iron bracing and securing strip. Fig. 3 is a perspective view of the felly-plate with one end only, showing the nut or lug; and Fig. 4 is a plan view of adjacent fellies with the bracing and securing strip in position, showing how it serves to brace the ends of the fellies and at the same time links them together.

A A represent two fellies, the adjacent ends of which are mortised centrally and adapted to receive the plate B, the length of which is just equal to the aggregate length of the mortises, so that when placed in the same a snug fit will be made and brace the fellies against movement toward each other.

C represents the bolts which pass through the plate B and fellies A, (the heads being countersunk in the plate,) and secured at their lower ends to the felly-plate D, or to ordinary securing-nuts, though I prefer the former for the reasons already set forth. The felly-plate when used, is provided with inwardly projecting threaded teats E, equidistant from the center, and serve to brace and link the fellies at the inner circumference.

It will be observed that with my improvement the rim of the wheel is secured irrespective of the tire, and it becomes unnecessary to weaken the latter by any large number of bolt-holes, only such number being used as may be necessary to retain the latter on the rim.

I am aware that quite a number of devices have been suggested for connecting or spreading the adjacent or meeting ends of fellies; but I am not aware that it has ever before been suggested to employ the means described by me, which not only hold the rim against spreading, but which at the same time serve as a brace against the opposite movement.

What I claim as new, and desire to secure by Letters Patent, is—

1. The fellies A A, provided with mortises or recesses in the exterior periphery of their meeting ends, in combination with the securing and bracing plate B of a length and width equal to the mortises, and provided with bolt-holes at or near each end, and adapted to be secured in place, substantially as and for the purposes set forth.

2. In combination with the fellies A A, recessed as described, and the contained bracing and securing plate B, fitting snugly therein, the felly-plate D, provided with projecting teats E, all arranged to be connected in proper relation with one another by securing-bolts, substantially as and for the purpose set forth.

PATRICK W. McGUIRE.

Witnesses:
  E. G. THOMAS,
  ISAAC A. LOVE.